Jan. 13, 1931.  F. E. SMITH ET AL  1,788,496

STUFFING BOX PACKING

Filed Dec. 26, 1925

WITNESS
G. V. Rasmussen

INVENTORS
FRANK E. SMITH
DONOVAN W. COLE
BY
Niesen Schrenk
ATTORNEYS

Patented Jan. 13, 1931

1,788,496

UNITED STATES PATENT OFFICE

FRANK EWART SMITH, OF BILLINGHAM-ON-TEES, AND DONOVAN WILDING COLE, OF NORTON-ON-TEES, ENGLAND, ASSIGNORS TO ATMOSPHERIC NITROGEN CORPORATION, OF SYRACUSE, NEW YORK, A CORPORATION OF NEW YORK

STUFFING-BOX PACKING

Application filed December 26, 1925, Serial No. 77,884, and in Great Britain December 29, 1924.

This invention relates to packing material, and more particularly to an improved metallic packing material for use in a stuffing box and involving novel methods of adjustment.

The ordinary type of metallic gland packing consists of rings of such a section that a flat surface is presented to the rod, and with such packing it is not practicable to reduce the clearance between the bearing surfaces to less than 1/1000 of an inch on account of the excessive wear which occurs with these small clearances. When the said small clearances are used, the packing demands continual attention and requires periodic renewal. Moreover, with the old type of gland packing the oil distribution between the bearing surfaces always tends to become irregular. As a result of this irregularity of lubrication, heavy wear and friction occur at the said bearing surfaces.

It is an object of the present invention to provide a packing for a gland or the like which offers a negligible frictional resistance and undergoes a minimal wear at the bearing surfaces not only when the gland is subjected to comparatively low pressures, but also to comparatively high pressures.

It is a further object of the invention to provide a gland packing ring which has a clearance less than 1/1000 of an inch and which is especially adapted for high pressure work in gas pumps or the like to prevent excessive leakage of the fluid therefrom. The said improved ring is such that the original shape thereof may be restored after being flattened by wear simultaneously with the adjustment of the clearance between the said ring and the rod or shaft therein.

Another object of the invention is to provide a gland which causes a regular distribution of oil on the aforesaid shaft or rod, and gives an improved uniform lubrication therefor.

Figure 1:
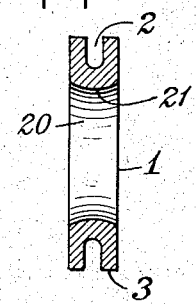
Figure 2:
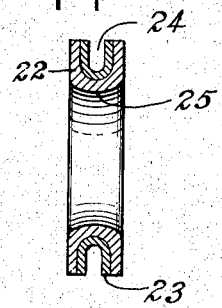
Figure 3:
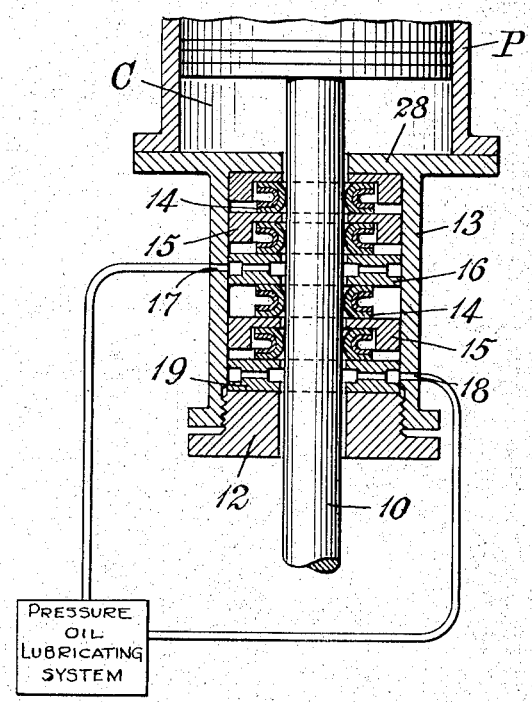
Figure 4:
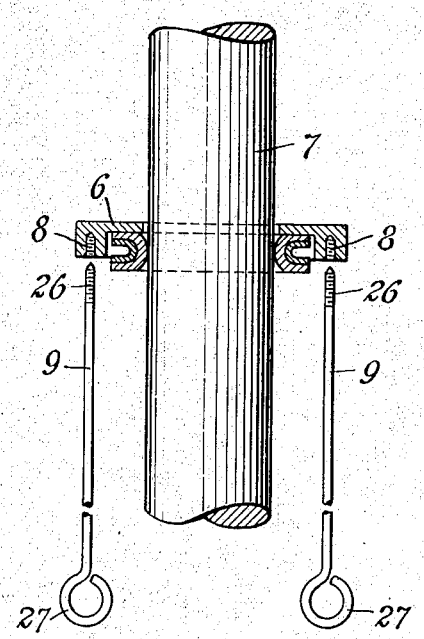

Other features and advantages of the invention will be made clear by a description of certain preferred embodiments thereof, as illustrated in the accompanying drawings, in which Fig. 1 is a vertical section through an embodiment of our invention; Fig. 2 is a view similar to Fig. 1 showing a modified embodiment of our invention; Fig. 3 is a sectional elevation of a complete gland having a plurality of our improved rings, as shown in Fig. 2, incorporated therein; and Fig. 4 illustrates a method of withdrawing the rings.

Generally speaking, our improved packing ring comprises an annular body portion 1 provided with a slot or deep groove 2 contiguous to the outer periphery 3 thereof. The inner periphery 20 has a slight convex curvature 21 which acts as the bearing surface. Any appreciable curvature of the said surface will give beneficial results, but as an example, radii of 2" to 9" may be specified.

The material of the ring may be any which is sensibly softer than that of the shaft, subject, of course, to the particular demands of individual cases and conditions of working temperature and pressure. Those metals or alloys which exhibit the properties of bearing or "anti-friction" metals will naturally be best adapted to this purpose, for example, white metal, or brass, etc., but the use of other metals or alloys is not excluded, since according to the invention such efficient lubrication is attained that the precise physical nature of the bearing surface becomes of lesser importance. It is not absolutely essential, though generally it will be the case, that the rings should be of softer material than the shaft. Again, while neither aluminum nor copper is generally considered suitable as a bearing metal, either may be used with advantage, when the principles of the present invention are applied to the design of the packing rings, and the wear of the rods is again practically negligible. Consequently, the use of copper or aluminum rings may be resorted to in circumstances where the use of ordinary bearing metal is attended with disadvantages. For example, white metal tends to flow when subjected to high pressure, and this tendency is of course accentuated by an increase in temperature. It is with the object of obtaining rings which are not deformable at moderately high temperatures and high pressures, that the use of rings of say aluminum or copper is contemplated. The wear on the plunger rod is, of course, greater than when true bearing metals are used, but still extremely small on account of the almost perfect lubrication maintained.

Now although the wear on the rings is small, in time the clearance does increase; but according to our invention it may easily be adjusted, and at the same time the original convexity of surface of the ring is restored.

A modification of our improved packing ring is shown in Fig. 2. An outer annular ring 22, made of a soft metal, like white metal, is provided with an insert ring 23 of a metal, like steel, for example, having a higher yield point than the outer ring. Both of the said rings have substantially a U-shaped cross-section so that the composite ring has a deep groove 24 contiguous to the outer periphery thereof. A bearing surface 25, having slight convex curvature, is provided on the inner periphery of said ring. By this composite construction, the material strength of the packing ring and its resistance to deformation under pressure is greatly improved, the constitution of the ring being such as to cause it to offer elastic resistance, during the time that the ring is under compression, to force applied to the sides of its U in an axial direction.

In a simple stuffing box 13 surrounding a member moving through a wall 28 of a pressure chamber C, as a pump P illustrated diagrammatically in Fig. 3, a number of packing rings 14 similar to the one shown in Fig. 2 are mounted side by side and are separated from each other by steel cage rings 15. A gland nut 12 is adjusted so as to allow the soft metal rings 14 just to float between the steel cage rings 15. In this state the gland remains during working until a small amount of wear occurs on the soft metal rings. The gland nut 12 is then tightened up, pressing the packing rings and the walls of the cage rings together, and producing a slight bulge in the said packing rings on their curved bearing surface. The slight bulge is checked by contact with the stationary shaft 10 and then the nut 12 is slacked back a trifle. This, by virtue of the elasticity of the metal, allows the rings to spring off the shaft about ¼ to ½ of a thousandth of an inch (which is just the desired amount for high pressure work) and also once more enables the rings to float in their cages.

The term "float" means that the packing rings are given a slight freedom of movement which is sufficient to give an automatic self-centering effect as will be explained hereinafter.

Adjustment after this manner will prolong indefinitely the life of a gland packing, and at the same time the gland will maintain its original efficiency and the plunger rod will only wear to minimal extent. In actual practice the stuffing box shown in Fig. 3 will be provided with two lantern rings 16 and 19 functioning respectively as inlet 17 and outlet 18 for the oil supply. It is generally advisable that as little oil as possible should reach the cylinder or chamber C, and, therefore, one or more packing rings 14 may be provided between the lantern rings 16 and the cylinder. A packing ring or rings of the same character as the packing rings 14 may be used between 19 and the outside of the gland to prevent extrusion of oil. Any number of the packing ring units may be used in series. It will be observed that in assembling the packing rings in the gland stuffing box, the legs of the U-shaped cross-section are at a substantial distance from the wall of the stuffing box or of the cage rings 15, so that the peripheral edges of the open ends of the U will always remain and be maintained spaced from a physically abutting surface, irrespective of the degree of compression to which the rings may be subjected, so that in all positions of adjustment the packing rings will be able to maintain their floating condition.

With the movement of the reciprocating plunger rod 10 of a pump P shown in Fig. 3 the oil is continually trapped between the ring and the rod, and the layer of lubricant between the two is consequently maintained intact. Moreover, as a result of the convexity of the surfaces, if at any time during the reciprocating motion of the rod, said rod is not in the exact center of the ring, the oil pressure on the closer side will exceed that on the other, and equilibrium will be restored only when the ring takes up the correct position, i e. equidistant at all points from the rod. This self-adjustment of the rings, due essentially to the convex surface, assists the success of the lubricating action referred to above, and as a result of these two factors, the final wear on the shaft is exceedingly small. Any appreciable curvature of the surface will give beneficial results, but as an example, radii of 2″ to 9″ may be specified.

When for any reason it is required to dismantle the gland packing, this may be conveniently effected as in Fig. 4 by screwing thin steel rods 9 having threads 26 at the ends thereof into small threaded holes 8, sunk part way into the wall of the cage rings 6. By grasping and pulling the free ends 27 of said rods, the cage rings 6 are thus easily drawn along the shaft 7 bringing the packing rings 4 with them.

It will be observed that the packing ring of this invention comprises an annulus substantially U-shaped in every radial cross-section of the annulus, the closed part of the U nearest to the center of the ring being slightly convex at the inner periphery of the ring to afford a bearing surface at said point. The outer faces of the legs of the U have portions located laterally, approximately, of the closed part of the U and these portions are disposed to receive compressive thrusts and to transmit the effect thereof directly to and through the metal constituting the closed part of the U. When therefore the nut 12 is tightened and compressive thrusts are thereby imparted to the rings in a lateral direction, the effect is not that of bending the legs of the U toward each other at the upper part of the U but to reduce the width of the ring in the region of the closed part of the U, thereby causing the formation of a convex condition at the inner periphery of the ring as the result of the transmission of the compressive thrusts directly to and through the metal constituting the closed part of the U.

While preferred embodiments of our invention are illustrated and described, it is to be understood that variations may be made without departing from the scope and spirit of the invention.

We claim:

1. The combination with a pressure chamber, a member movable through a wall of said chamber, and a stuffing box contiguous to said wall surrounding said movable member, of an undivided packing ring contained in said stuffing box and around said movable member, said ring having a substantially U-shaped cross-section in which the open portion between the legs of said U is at the outermost periphery of said ring and the closed body portion of the U is at the innermost periphery of said ring, said innermost periphery forming a convex bearing surface making line contact with the aforesaid movable member, and compressive elements adapted to transmit compressive forces to the legs of the U to cause bulging of the closed body portion inwardly toward the center of the ring, said ring being in floating relation with respect to the walls of the stuffing box, whereby said ring may center itself with respect to said movable member.

2. The combination with a pressure chamber, a member movable through a wall of said chamber, and a stuffing box contiguous to said wall surrounding said movable member, of an undivided packing ring contained in said stuffing box and around said movable member, said ring having a substantially U-shaped cross-section in which the open portion between the legs of said U is at the outermost periphery of said ring and the closed body portion of said U is at the innermost periphery of said ring, the legs of said ring projecting in parallel relation to each other outwardly from the body portion and extending a sufficient distance to provide substantially parallel bearing faces for compressive elements adapted to transmit compressive forces to the said parallel bearing faces axially of the movable member to cause bulging of the closed body portion inwardly toward the center of the ring to form a convex bearing surface making line contact with the aforesaid moving member, the outer periphery of the ring being spaced from the walls of the stuffing box, whereby said ring may center itself with respect to said moving member.

3. The combination with a pressure chamber, a member movable through a wall of said chamber, and a stuffing box contiguous to said wall surrounding said movable member, of an undivided packing ring contained in said stuffing box and around said movable member, said ring having a substantially U-shaped cross-section in which the open portion between the legs of said U is at the outermost periphery of said ring and the closed body portion of the U is at the innermost periphery of said ring, said innermost periphery forming a convex bearing surface making line contact with the aforesaid moving member, the exterior of said U-shaped cross-section being composed of a soft metal and the interior being composed of a metal having a higher yield point than said soft metal, and compressive elements adapted to transmit compressive forces to the legs of the U to cause bulging of the closed body portion inwardly toward the center of the ring, said ring being in floating relation with respect to the walls of the stuffing box, whereby said ring may center itself with respect to said moving member.

In testimony whereof we have hereunto set our hands.

F. E. SMITH.
D. WILDING COLE.